(12) United States Patent
Belpaire

(10) Patent No.: US 9,623,814 B2
(45) Date of Patent: Apr. 18, 2017

(54) REINFORCEMENT WITH CHANNEL DESIGN

(75) Inventor: Vincent Belpaire, Uccle (BE)

(73) Assignee: SIKA TECHNOLOGY AG, Baar (CH)

( * ) Notice: Subject to any disclaimer, the term of this patent is extended or adjusted under 35 U.S.C. 154(b) by 1149 days.

(21) Appl. No.: 13/061,637

(22) PCT Filed: Sep. 1, 2009

(86) PCT No.: PCT/EP2009/061271
§ 371 (c)(1),
(2), (4) Date: Jun. 15, 2011

(87) PCT Pub. No.: WO2010/023325
PCT Pub. Date: Mar. 4, 2010

(65) Prior Publication Data
US 2011/0236610 A1    Sep. 29, 2011

(30) Foreign Application Priority Data

Sep. 1, 2008 (EP) .................................. 08163414

(51) Int. Cl.
*B62D 29/00* (2006.01)
*B60R 13/08* (2006.01)

(52) U.S. Cl.
CPC ............ *B60R 13/08* (2013.01); *B62D 29/001* (2013.01); *B62D 29/002* (2013.01); *B62D 29/004* (2013.01); *Y10T 428/13* (2015.01)

(58) Field of Classification Search
CPC .............................. B60R 13/08; B62D 29/002
USPC .................................................. 296/187.02
See application file for complete search history.

(56) References Cited

U.S. PATENT DOCUMENTS

| | | | | |
|---|---|---|---|---|
| 6,247,287 B1 * | 6/2001 | Takabatake | ............. | B29C 44/18 264/46.6 |
| 6,279,990 B1 * | 8/2001 | Miyasaka | ............ | B62D 25/025 296/193.06 |
| 6,305,136 B1 * | 10/2001 | Hopton | ................... | B29C 44/18 296/146.6 |

(Continued)

FOREIGN PATENT DOCUMENTS

| | | |
|---|---|---|
| EP | 1064188 A1 | 1/2001 |
| EP | 1149679 A2 | 10/2001 |

(Continued)

OTHER PUBLICATIONS

Machine translation of JP H07/031569 U, obtained from Industrial Property Digital Library of the JPO on Jul. 6, 2015.*

(Continued)

*Primary Examiner* — Aaron Austin
*Assistant Examiner* — Zheren J Yang
(74) *Attorney, Agent, or Firm* — Buchanan Ingersoll & Rooney PC

(57) ABSTRACT

A reinforcement includes a carrier having a plurality of exterior walls spaced from one another. The carrier defines a channel extending substantially parallel to a longitudinal axis defined by a cavity. A material layer is disposed on at least one of the exterior walls within the channel such that an electrocoating material is able to flow through the channel before the material layer is expanded and the channel is substantially filled after the material layer is expanded.

14 Claims, 4 Drawing Sheets

(56) References Cited

U.S. PATENT DOCUMENTS

| | | | | |
|---|---|---|---|---|
| 6,341,467 | B1* | 1/2002 | Wycech | B29C 44/18 296/193.06 |
| 6,357,819 | B1* | 3/2002 | Yoshino | B29C 44/18 296/187.02 |
| 6,481,776 | B2* | 11/2002 | Adachi | B60R 13/025 280/748 |
| 6,702,368 | B1* | 3/2004 | Hanyu | B62D 25/04 296/193.05 |
| 6,729,425 | B2* | 5/2004 | Schneider | B62D 29/002 180/68.5 |
| 8,746,780 | B2* | 6/2014 | Belpaire | B62D 25/16 296/187.02 |
| 2001/0020794 | A1* | 9/2001 | Ishikawa | B62D 25/04 296/187.02 |
| 2001/0039780 | A1* | 11/2001 | Matsuki | B62D 29/04 52/742.1 |
| 2001/0042353 | A1* | 11/2001 | Honda | B29C 44/1228 296/146.6 |
| 2004/0046421 | A1* | 3/2004 | Barz | B62D 29/002 296/187.02 |
| 2005/0276970 | A1* | 12/2005 | Busseuil | B62D 25/00 428/343 |
| 2007/0090560 | A1* | 4/2007 | Kassa | B29C 44/18 264/230 |
| 2008/0217960 | A1* | 9/2008 | Kochert et al. | 296/193.06 |
| 2008/0296164 | A1* | 12/2008 | Dajek | B62D 29/002 205/80 |
| 2010/0264693 | A1* | 10/2010 | Gandhi | B62D 29/002 296/187.01 |
| 2011/0104413 | A1* | 5/2011 | Mendibourne | B62D 29/002 428/35.7 |
| 2013/0257098 | A1* | 10/2013 | Matsuda | B62D 25/00 296/187.12 |
| 2013/0328349 | A1* | 12/2013 | Lewis | B60R 13/0815 296/187.02 |
| 2014/0084633 | A1* | 3/2014 | Matsuda | B62D 25/02 296/203.01 |

FOREIGN PATENT DOCUMENTS

| | | | | |
|---|---|---|---|---|
| FR | 2749263 | A1 * | 12/1997 | .......... B62D 29/002 |
| FR | 2749263 | A1 | 12/1997 | |
| JP | H07/031569 | U * | 6/1995 | |
| JP | 2000-211551 | A | 8/2000 | |
| JP | 2001-199362 | A | 7/2001 | |
| JP | 2001199362 | A * | 7/2001 | |
| JP | WO 2004002809 | A1 * | 1/2004 | .......... B62D 29/001 |
| JP | 2007084015 | A | 4/2007 | |
| JP | 2010036696 | A * | 2/2010 | |
| WO | WO 2007082677 | A1 * | 7/2007 | |

OTHER PUBLICATIONS

Definition of the term "Define" from Oxford English Dictionary. Retrieved on Jul. 13, 2015 from www.oed.com.*
Machine transaltion of FR 2,749,263 A1, obtained using Google Translate on Apr. 27, 2016.*
Machine translation of JP 2001/199362 A, obtained from Industrial Property Digital Library of the JPO.*
Machine translation of JP 2010/036696 A, obtained from Industrial Property Digital Library of the JPO.*
International Search Report for PCT/EP2009/061271.
Office Action (Notice of Decision for Rejection) issued on May 30, 2016, by the Korean Patent Office in corresponding Korean Patent Application No. 10-2011-7006680, and an English Translation of the Office Action. (8 pages).
Office Action (Notice of Reasons for Rejection) issued on Oct. 1, 2013, by the Japanese Patent Office in corresponding Japanese Patent Application No. 2011-524416, and an English Translation of the Office Action. (7 pages).
Office Action (Notice of Decision for Rejection) issued on Sep. 23, 2016, by the Korean Patent Office in corresponding Korean Patent Application No. 10-2011-7006680, and an English Translation of the Office Action. (8 pages).
Office Action (Notice of Reasons for Rejection) issued on Feb. 23, 2016, by the Japanese Patent Office in corresponding Japanese Patent Application No. 2011-524416, and an English Translation of the Office Action. (14 pages).

* cited by examiner

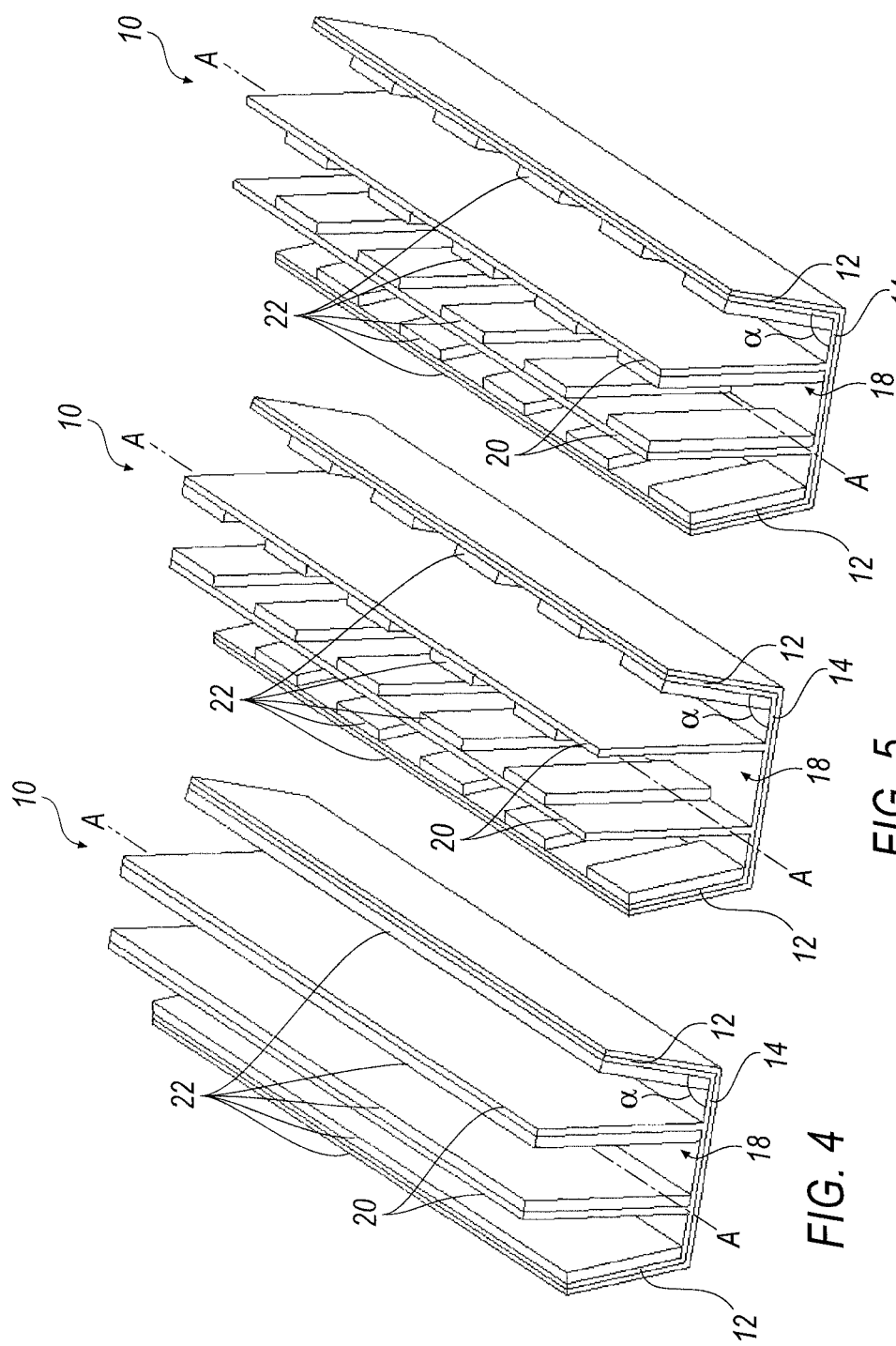

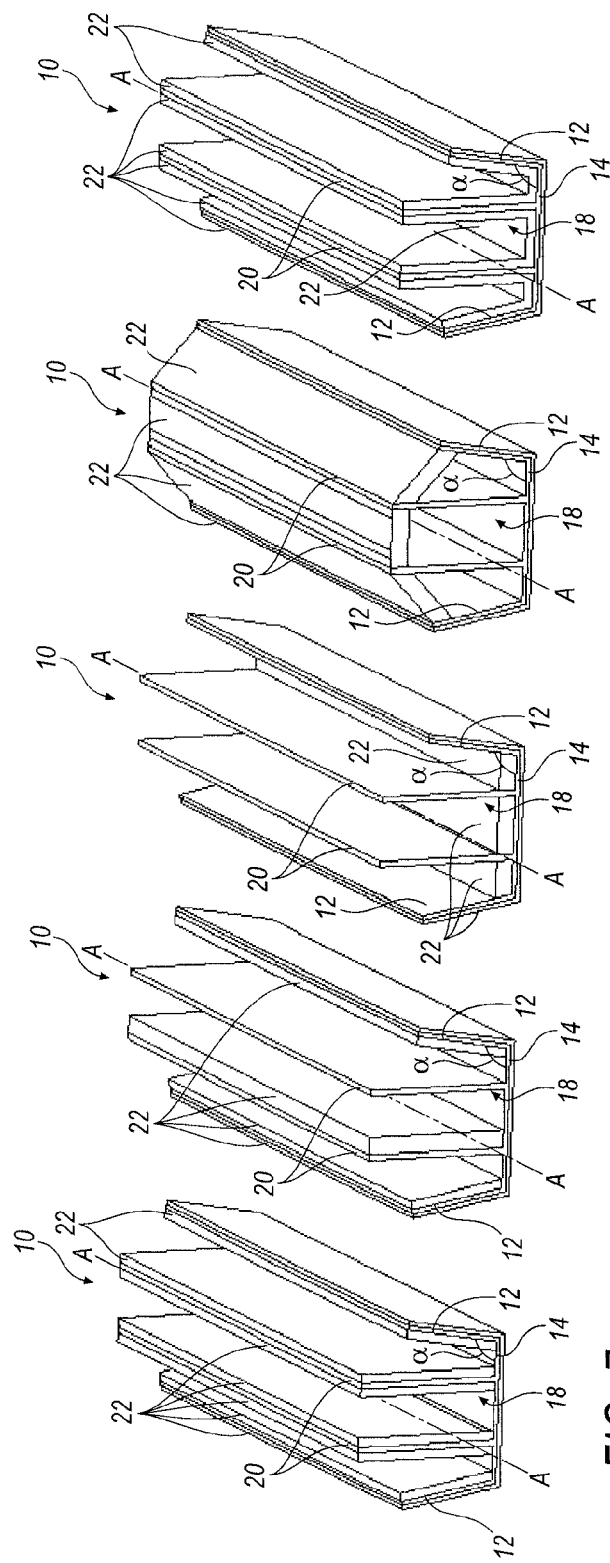

REINFORCEMENT WITH CHANNEL DESIGN

CROSS-REFERENCE TO RELATED APPLICATIONS

This application claims priority to EP application number 08163414.9 filed on Sep. 1, 2008 and International Application No. PCT/EP2009/061271 filed on Sep. 1, 2009, the entirety of which are hereby incorporated by reference.

BACKGROUND

Reinforcements are used in various industries to provide structural support to or reduce noise and/or vibrations in various products. For example, in the automotive industry, the reinforcement may be used to reinforce beams, pillars, rails, nodes, doors, or roof of the vehicle. The reinforcement may include a carrier disposed in a cavity of the product, and a material layer, such as structural or acoustic foam or an adhesive, is disposed on the carrier. The carrier may be made from plastic or metal bonded with the material layer. Accordingly, the material layer generally has adhesive properties.

In FR 2 749 263 a reinforcement is disclosed, in which a foam in its unfoamed state almost fills the entire space in between the longitudinal ribs and the structure. This is needed as the foam is designed to fill the full chamber. The function of the foam in between the longitudinal ribs is to connect the carrier to the structure to be reinforced.

Sometimes, the carrier includes an array of ribs. The material layer is applied around the carrier in a way that a gap between the carrier and the cavity remains free to electrocoating flow. The size of the gap greatly impacts the effectiveness of the electrocoating process. For example, if the gap is too large and the material layer is relatively thick, the global mechanical performance of the carrier is decreased. For example, the gap may be 6 to 10 mm and partially filled with the unexpanded material layer, which may have lower performance due to a weak bonding between the carrier and the product to be reinforced. If the gap is too small (0 to 4 mm), the electrocoating will not effectively protect against corrosion of the product because there is not enough room for an electrocoating material to flow. Therefore, a reinforcement is needed that allows for effective electrocoating with a smaller or no gaps between the carrier and the product.

SUMMARY

A reinforcement includes a carrier having a plurality of exterior walls spaced from one another and defining a channel extending substantially parallel to a longitudinal axis defined by a cavity. A material layer is disposed on at least one of the exterior walls within the channel such that an electrocoating material is able to flow through the channel before the material layer is expanded and the channel is substantially filled after the material layer is expanded. Accordingly, gaps between the carrier and an object to be reinforced may be reduced or eliminated without substantially affecting the electrocoating process.

BRIEF DESCRIPTION OF THE DRAWINGS

The foregoing description will be understood more completely from the following detailed description of the exemplary drawings, in which:

FIG. 4 is an illustration of the carrier where the material layer is continuous in a longitudinal direction, according to an embodiment;

FIG. 5 is an illustration of the carrier where the material layer is discontinuous in a longitudinal direction, according to an embodiment;

FIG. 6 is an illustration of the carrier where the material layer is discontinuous and alternative, according to an embodiment;

FIG. 7 is an illustration of the carrier where the material layer is continuous in a transverse direction and disposed on the exterior walls and longitudinal ribs, according to an embodiment;

FIG. 8 is an illustration of the carrier where the material layer is continuous in a transverse direction and disposed on the exterior walls and one of the longitudinal ribs, according to an embodiment;

FIG. 9 is an illustration of the carrier where the material layer is disposed on a base of the carrier, according to an embodiment;

FIG. 10 is an illustration of the carrier where the material layer extends between the exterior walls and the longitudinal ribs and between the longitudinal ribs spaced from the base, according to an embodiment; and FIG. 11 is an illustration of the carrier where the material layer is disposed on the exterior walls, the longitudinal ribs, and the base.

DETAILED DESCRIPTION

A reinforcement includes a carrier having a plurality of exterior walls spaced from one another. The carrier defines a channel extending substantially parallel to a longitudinal axis defined by a cavity. A material layer is disposed on at least one of the exterior walls within the channel such that an electrocoating material is able to flow through the channel before the material layer is expanded and the channel is substantially filled after the material layer is expanded. In one embodiment, removing transverse ribs from the carrier creates new flow channels for the electrocoating process, and the material layer interconnects the longitudinal ribs after expansion in the baking process. In another embodiment, the carrier may include transverse ribs that provide additional support to the carrier, but do not interfere with the electrocoating process.

Figure 1:
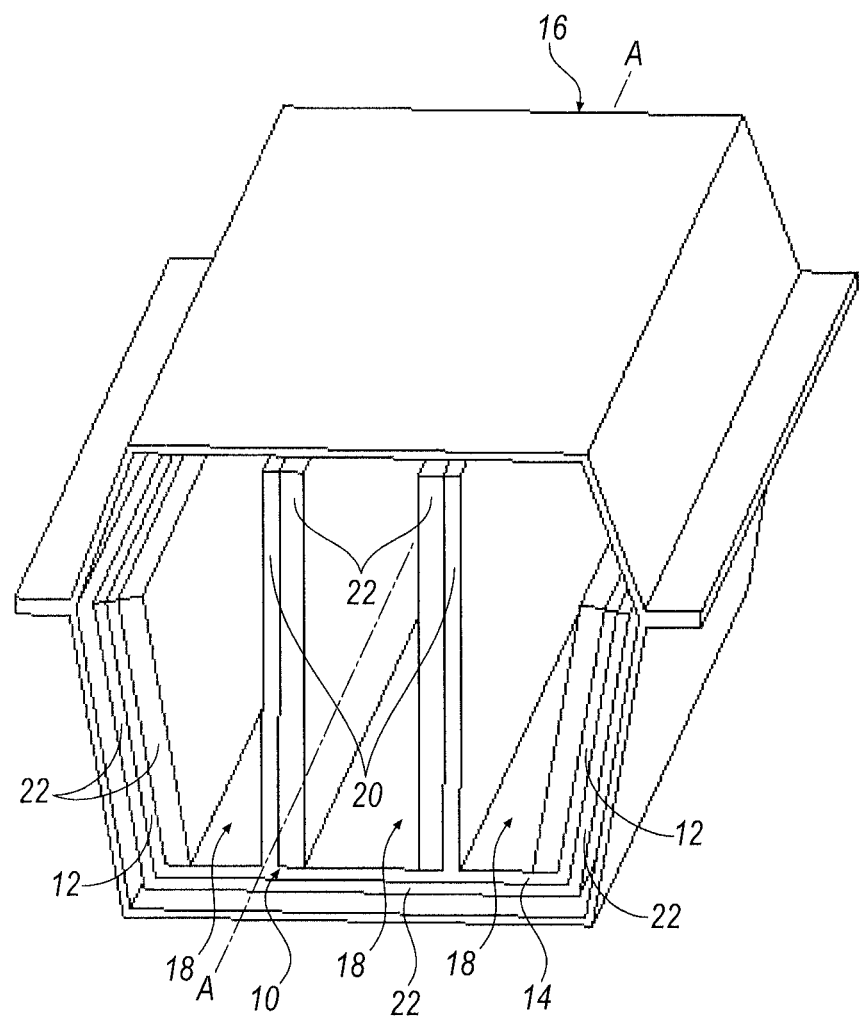
FIG. 1 is an illustration of a carrier disposed within a cavity having exterior walls and longitudinal ribs with a material layer disposed thereon and defining multiple channels, according to an embodiment.

FIG. 1 illustrates an exemplary reinforcement having a carrier 10 with a plurality of exterior walls 12 spaced from one another and connected by a base 14. The carrier 10 may be formed of any material, such as metal, plastic, or a hybrid of plastic and metal, and is disposed in a cavity of an object 16 to be reinforced. The cavity defines a longitudinal axis A, and the carrier 10 defines at least one channel 18 extending substantially parallel to the longitudinal axis A. The channel 18 may have any length relative to the carrier 10. For example, the channel length along the longitudinal axis A may be longer than a width of the carrier 10 transverse to the longitudinal axis A, or alternatively, the channel 18 may be shorter along the longitudinal axis A than it is wide. The carrier 10 may include a plurality of longitudinal ribs 20 spaced from the exterior walls 12. In one exemplary approach, the longitudinal ribs 20 extend in a direction substantially parallel to the exterior walls 12 and the longitudinal axis A. In this embodiment, multiple channels 18 are defined by the longitudinal ribs 20 and/or the exterior walls 12.

A material layer 22 may include acoustic foam, structural foam, and/or an adhesive disposed onto at least one of the exterior walls 12 and/or at least one of the longitudinal ribs 20 within the channel 18. For example, the material layer 22 may be over-molded or beaded onto the carrier 10. Alternatively, the material layer 22 may be mechanically attached with pins, hooks, or other fittings. The material layer 22 may be disposed on an inner surface and/or outer surface of the exterior walls 12. In one exemplary approach, the material layer 22 may expand or cure when subject to heat. For example, if the material layer 22 includes structural or acoustic foam used in a vehicle pillar, the foam may expand when in the paint bake process. Alternatively, if the material layer 22 includes the adhesive, the adhesive will cure during the paint bake process. The material layer 22 expands to fill the channel 18 and interconnect the longitudinal ribs 20 and the exterior walls 12. It is to be appreciated that the material layer 22 need not expand to completely fill the channel 18 and the amount of expansion needed is dependent upon the amount of loading on the carrier 10. For example, in low loading situations, the material layer 22 may include acoustic foam that expands to fill the entire channel 18 instead of structural foam that may not expand to fill the entire channel 18. It is to be appreciated that in other situations, structural foam may be replaced with acoustic foam to provide acoustic sealing or sealing against gas, dust, and humidity.

Figure 2:
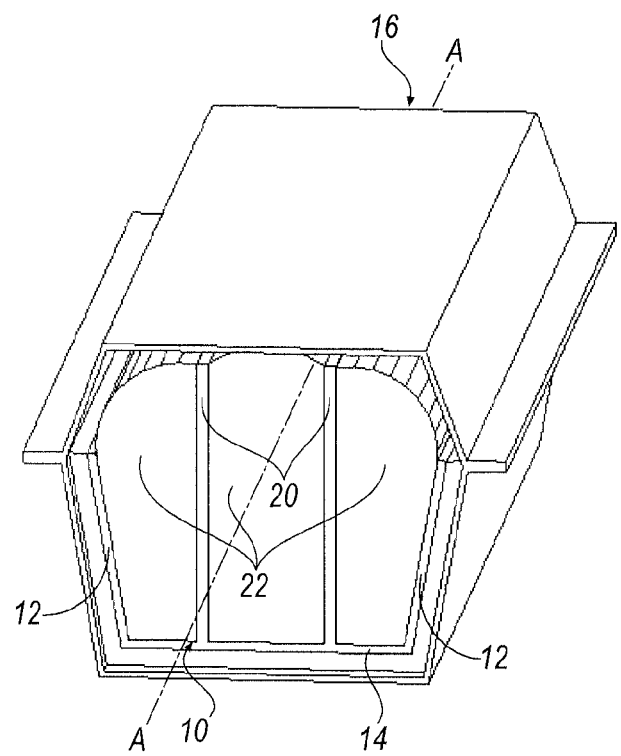
FIG. 2 is an illustration of the carrier of FIG. 1 where the material layer has been expanded to fill the channel, according to an embodiment.

However, before the material layer 22 is expanded, the object 16 to be reinforced may be subject to an electrocoating process to reduce corrosion. In this embodiment, there may be a gap of 0.5 to 3 mm between the material layer 22 and the cavity, and as the material layer 22 expands, it at least partially fills the gap. For example, if the material layer 22 is the adhesive disposed between the gap and the carrier 10, the gap may be completely filled by the adhesive squeezed into the gap. Alternatively, additional adhesive may be squeezed into the gap once the material layer 22 has expanded to at least partially fill the gap. The electrocoating process may include spraying an electrocoating material onto the object 16 in a direction substantially parallel to the longitudinal axis A through the channel 18 and/or the gap. The carrier 10 is configured so that the electrocoating material is able to flow through the channel 18 before the material layer 22 is expanded. In other words, the material layer 22 may be disposed within the channel 18 prior to the electrocoating process, but does not substantially interfere with the flow of the electrocoating material through the channel 18. FIG. 2 illustrates the material layer 22 including acoustic foam that has expanded to fill the channel 18 after the electrocoating material has been applied to the reinforced object 14.

Figure 3:
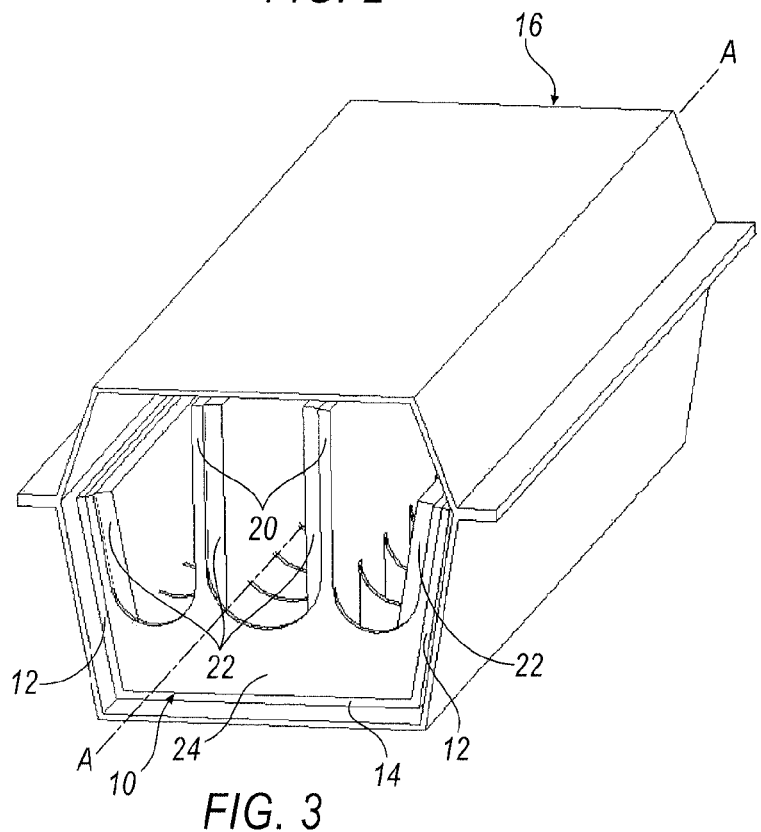
FIG. 3 is an illustration of the carrier having transverse ribs, according to an embodiment.

FIG. 3 illustrates an exemplary embodiment of the reinforcement where the carrier 10 includes a plurality of transverse ribs 24 extending in a direction transverse to the exterior walls 12, the longitudinal ribs 20, and the longitudinal axis A. In other words, the transverse ribs 24 extend in a direction transverse to the electrocoating direction. The transverse ribs 24 may help prevent buckling of the longitudinal ribs 20. As with the exterior walls 12 and longitudinal ribs 20, the material layer 22 may be at least partially disposed on at least one of the transverse ribs 24. Accordingly, the transverse ribs 24 extend in a direction transverse to the channel 18. So that the electrocoating material can pass through the channel 18, the transverse ribs 24 may be shorter than the longitudinal ribs 20 and/or the exterior walls 12. In one exemplary approach, the transverse ribs 24 have less than 80% of cross-sectional area of the cavity. As illustrated in FIG. 3, the transverse ribs 24 may have a U-shaped opening or any other configuration. In one embodiment, the transverse ribs 24 may define holes and/or cuts to allow the electrocoating material to pass. For example, the channel 18 may be defined by holes formed in the transverse ribs 24.

FIGS. 4-11 illustrate an embodiment of the reinforcement having two exterior walls 12 extending at an angle α from the base 14 of the carrier 10. Two longitudinal ribs 20 extend perpendicularly from the base 14. In this embodiment, the carrier 10 defines three channels 18. Specifically, two channels 18 are defined by one of the exterior walls 12 and one of the longitudinal ribs 20. The third channel 18 is defined by the two longitudinal ribs 20. Although not shown, the carriers 10 of FIGS. 4-11 may include one or more transverse ribs 24.

In FIG. 4-6, the material layer 22 is disposed on inner and outer surfaces of each of the exterior walls 12, on an outer surface of the base 14, and on inner surfaces of each of the longitudinal ribs 20 in a longitudinal direction. In FIG. 4, the material layer 22 is continuous along the longitudinal ribs 20 and the exterior walls 12, which means that the material layer 22 is constant in geometry. For example, the material layer 22 may be a rectangular, trapezoidal, square, triangular, circular, or any other shape or cross-sectional configuration. Continuous material layers 22 may be produced by extrusion. In the case of complete uniform sections to be reinforced, the carrier 10 by itself or the carrier 10 with the material layer 22 could be produced by extrusion or co-extrusion. In FIGS. 5 and 6, the material layer 22 is discontinuous, which means that the material layer 22 is divided into sections with spaces therebetween, along the longitudinal ribs 20 and the exterior walls 12. This variable configuration may provide variable final density and local mechanical properties. Moreover, in this embodiment, the material layer 22 could also provide support in buckling areas, and specifically, buckling areas on the longitudinal ribs 20. In one embodiment, the material layer 22 could be linked with material channels 18 to facilitate the manufacturing. In FIG. 5, the material layer 22 disposed on the longitudinal ribs 20 is alternative or staggered compared to the material layer 22 on the inner surface of the exterior walls 12.

In FIGS. 7-11, the material layer 22 is disposed on the carrier 10 in a transverse direction and in different configurations or placed on various surfaces of each of the walls or ribs. Although illustrated as being continuous, in another embodiment, the material layer 22 may be discontinuous or discontinuous and alternative. In FIG. 7, the material layer 22 is disposed on the inner and outer surfaces of the exterior walls 12 and longitudinal ribs 20. The material layer 22 is also disposed on the outer surface of the base 14. In FIG. 8, the material layer 22 is disposed on the inner surface of one of the longitudinal ribs 20, the outer surface of the base 14, and the inner and outer surfaces of the exterior walls 12. In FIG. 9, the material layer 22 is disposed on the inner and outer surfaces of the base 14, and the outer surface of the exterior walls 12. In FIG. 10, the material layer 22 is disposed on the outer surfaces of the base 14 and exterior walls 12, and further extends between each of the exterior walls 12 to one of the longitudinal ribs 20 spaced from the base 14. Also, the material layer 22 extends between the longitudinal ribs 20 spaced from the base 14. In FIG. 11, the material layer 22 is disposed on the inner and outer surfaces of the exterior walls 12, the base 14, and the longitudinal ribs 20. Although not illustrated, the embodiments of FIGS. 7-11 may further include transverse ribs 24 as previously described.

The foam placed in between the longitudinal ribs 20 and the exterior walls 12 is preferably designed to only fill the channels 18 in between the ribs. The unfoamed cross section is less to permit e-coat flow through the channels 18. The material layer 22 on the inner face of exterior walls 12 or on longitudinal ribs 20 is preferably an expandable material that supports the longitudinal ribs and avoid them to buckle.

The connection of the carrier 10 to the structure 16 is preferably ensured by other foam components or adhesive disposed on the exterior walls 12. The material layer 22 on the outer face of exterior walls 12 facing the object 16 is preferably an expandable material or an adhesive that bonds the carrier to the structure.

The above description is intended to be illustrative and not restrictive. Many alternative approaches or applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future examples. In sum, it should be understood that the invention is capable of modification and variation and is limited only by the following claims.

The present embodiments have been particularly shown and described, which are merely illustrative of the best modes. It should be understood by those skilled in the art that various alternatives to the embodiments described herein may be employed in practicing the claims without departing from the spirit and scope as defined in the following claims. It is intended that the following claims define the scope of the invention and that the method and apparatus within the scope of these claims and their equivalents be covered thereby. This description should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

All terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

I claim:

1. A reinforced system, comprising:
   a hollow structure, wherein the hollow structure is elongated in a longitudinal direction;
   a carrier disposed inside of the hollow structure, the carrier having the following:
   two exterior walls spaced from one another, wherein each of the exterior walls is elongated in the longitudinal direction;
   a plurality of longitudinal ribs disposed between the exterior walls that form a plurality of channels between the exterior walls, wherein each channel is defined by one of the following: (i) a combination of one of the exterior walls and one of the ribs opposing the exterior wall, and (ii) a combination of two opposing ribs, wherein each of the longitudinal ribs is elongated in the longitudinal direction;
   a first layer of expandable material disposed on at least one outer surface of said carrier and configured to bond said outer surface of said carrier to the hollow structure; and
   a second layer of expandable material disposed on one of an inner surface of one of the exterior walls and an opposing surface of a rib, such that the second layer of expandable material is within a particular channel and that a gap exists in the channel between the second layer of expandable material and the opposing exterior wall or opposing rib;
   wherein the second layer of expandable material is configured such that fluid is able to flow through the gap before the second expandable material layer is expanded, and, after the second layer of expandable material is expanded, the gap is sealed against the passage of materials,
   wherein said carrier includes a plurality of transverse ribs extending in a direction transverse to said exterior walls and said longitudinal ribs, wherein each of the transverse ribs is elongated in the transverse direction,
   wherein the height of said transverse ribs is less than the height of said longitudinal ribs.

2. A The reinforced system as set forth in claim 1, wherein said exterior walls each have an outer surface and wherein said first layer of expandable material layer is disposed on said outer surface of at least one of said exterior walls.

3. The reinforced system as set forth in claim 1, wherein said second expandable material layer is at least partially disposed on at least one of said longitudinal ribs.

4. The reinforced system as set forth in claim 1, wherein said second expandable material layer is continuous along said longitudinal ribs and said exterior walls.

5. The reinforced system as set forth in claim 1, wherein the exterior walls defines a channel extending substantially parallel to a longitudinal axis defined by a cavity, wherein said transverse ribs have less than 80% of the cross-sectional area of the cavity.

6. The reinforced system as set forth in claim 1, wherein said second expandable material layer is at bast partially disposed on at least one of said transverse ribs.

7. The reinforced system as set forth in claim 1, wherein the exterior walls defines a channel extending substantially parallel to a longitudinal axis defined by a hollow cavity, wherein a gap between said first expandable material layer and a wall defining said hollow cavity is between 0.5 and 3 mm.

8. The reinforced system as set forth in claim 1, wherein said second expandable material layer includes a structural foam, an acoustic foam, or an adhesive.

9. The reinforced system as set forth in claim 1, wherein said first expandable material layer is over-molded onto said carrier.

10. The reinforced system as set forth in claim 1, wherein said material layer is disposed on said carrier in buckling areas.

11. The reinforced system of claim 1, wherein the ribs and exterior walls are substantially parallel to each other.

12. The reinforced system of claim 1, wherein each channel is defined by one of the following: (i) a combination of one of the exterior walls and a major surface of a rib opposing the exterior wall, and (ii) a combination of a major surface of a first rib and a major surface of an opposing rib.

13. The reinforced system of claim 1, wherein the carrier is a molded, single-piece component.

14. A reinforced system, comprising:
- a hollow structure, wherein the hollow structure is elongated in a longitudinal direction;
- a carrier disposed inside of the hollow structure, the carrier having the following:
- two exterior walls spaced from one another, wherein each of the exterior walls is elongated in the longitudinal direction;
- at least one longitudinal rib disposed between the exterior walls that forms at least one channel between the exterior walls, wherein the at least one channel is defined by one of the following: (i) a combination of one of the exterior walls and the at least one rib opposing the exterior wall, and (ii) a combination of two opposing ribs, wherein the longitudinal rib is elongated in the longitudinal direction;
- a first layer of expandable material disposed on at least one outer surface of said carrier and configured to bond said outer surface of said carrier to the hollow structure; and
- a second layer of expandable material disposed on one of an inner surface of one of the exterior walls and an opposing surface of a rib, such that the second layer of expandable material is within a particular channel and that a gap exists in the channel between the second layer of expandable material and the opposing exterior wall or opposing rib;
- wherein the second layer of expandable material is configured such that fluid is able to flow through the gap before the second expandable material layer is expanded,
- wherein said carrier includes at least one transverse rib extending in a direction transverse to said exterior walls and said longitudinal rib, wherein the at least one transverse rib is elongated in the transverse direction,
- wherein the height of said transverse rib is less than the height of said longitudinal rib.

* * * * *